(12) United States Patent
Wu

(10) Patent No.: US 8,385,267 B2
(45) Date of Patent: Feb. 26, 2013

(54) CLIENT ROUTING IN A PEER-TO-PEER OVERLAY NETWORK

(75) Inventor: Wei Wu, Coppell, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 395 days.

(21) Appl. No.: 12/709,310

(22) Filed: Feb. 19, 2010

(65) Prior Publication Data

US 2011/0205960 A1 Aug. 25, 2011

(51) Int. Cl.
*H04W 4/00* (2009.01)
(52) U.S. Cl. .......................... 370/328; 370/352
(58) Field of Classification Search .................. 370/254, 370/238, 328–338, 352–356; 709/238, 220, 709/242, 228, 241
See application file for complete search history.

(56) References Cited

U.S. PATENT DOCUMENTS

| | | | |
|---|---|---|---|
| 7,643,458 B1 * | 1/2010 | Talwar et al. ................. | 370/338 |
| 2002/0184357 A1 | 12/2002 | Traversat et al. | |
| 2006/0187900 A1 | 8/2006 | Akbar | |
| 2007/0237139 A1 | 10/2007 | Garcia-Martin et al. | |
| 2009/0248822 A1 | 10/2009 | De Vriendt et al. | |
| 2010/0064008 A1 * | 3/2010 | Yan et al. ....................... | 709/204 |

FOREIGN PATENT DOCUMENTS

WO WO 2008041173 A2 * 4/2008

OTHER PUBLICATIONS

PCT International Search Report; PCT Application No. PCT/US11/25346; Apr. 19, 2011; 3 pages.
PCT Written Opinion of the International Search Authority; PCT Application No. PCT/US11/25346; Apr. 19, 2011; 6 pages.

* cited by examiner

*Primary Examiner* — Ricky Ngo
*Assistant Examiner* — Iqbal Zaidi
(74) *Attorney, Agent, or Firm* — Conley Rose, P.C.; J. Robert Brown, Jr.

(57) ABSTRACT

A method of client routing in a peer-to-peer ("P2P") overlay network is provided. In one embodiment, the method of client routing in a P2P overlay network comprises requesting communication with a client by a first peer using the P2P overlay network, wherein said first peer is directed to a second peer to which said client is registered in the P2P overlay network; determining that said client is not attached to said second peer in the P2P overlay network and said client has access to another network; providing said second peer with said client's location in the P2P overlay network using said other network, wherein said client's location is associated with a third peer to which said client is attached and not registered in the P2P overlay network; forwarding said client's location from said second peer to said first peer using the P2P overlay network, and using said client's location to communicate with said client by said first peer using the P2P overlay network.

31 Claims, 11 Drawing Sheets

CLIENT ROUTING IN A PEER-TO-PEER OVERLAY NETWORK

CROSS-REFERENCE TO RELATED APPLICATIONS

There are no related applications.

FIELD

The invention generally relates to communication networks and, more particularly, to methods, devices and systems for providing client routing in a peer-to-peer overlay network.

BACKGROUND

Peer-to-peer ("P2P") networks are distributed systems with no centralized control where each node in the system uses as well as offers various services. These services are used to support various P2P applications such as voice over IP ("VOIP"), file sharing, video streaming and other applications. Since P2P systems have no centralized control, the routing of data among peers is handled in a distributed manner. Various P2P overlay network routing protocols are used to perform P2P communications such as JXTA, gnutella, FastTrack, Chord, Pastry and others.

While many higher-end wireless devices support P2P applications, there are still many important technical issues to be resolved to allow for more seamless operation of P2P applications within and across heterogeneous networks. For instance, higher-end wireless devices typically can use only VOIP application while accessing a Wi-Fi network. Further, the system architecture of wireless network operators is based typically on a centralized-server architecture. A centralized-server architecture typically does not lend itself to the efficient operation of a P2P overlay network, which is self-organized and distributed. As the demand for P2P applications continues to increase, network operators will be looking for technical advancements to improve the performance and functionality of P2P services on and across their networks.

BRIEF DESCRIPTION OF THE DRAWINGS

In order for this disclosure to be understood and put into practice by persons skilled in the art, reference is now made to exemplary embodiments as illustrated by reference to the accompanying figures. Like reference numbers refer to identical or functionally similar elements throughout the accompanying figures. The figures along with the detailed description are incorporated and form part of the specification and serve to further illustrate exemplary embodiments and explain various principles and advantages, in accordance with this disclosure, where.

Skilled artisans will appreciate that elements in the accompanying figures are illustrated for clarity, simplicity and to further help improve understanding of the embodiments, and have not necessarily been drawn to scale.

DETAILED DESCRIPTION

Although the following discloses exemplary methods, devices and systems for use in communication networks, it will be understood by one of ordinary skill in the art that the teachings of this disclosure are in no way limited to the examplaries shown. On the contrary, it is contemplated that the teachings of this disclosure may be implemented in alternative configurations and environments. For example, although the exemplary methods, devices and systems described herein are described in conjunction with a configuration for aforementioned P2P overlay network, those of ordinary skill in the art will readily recognize that the exemplary methods, devices and systems may be used in other networks and may be configured to correspond to such other networks as needed. Accordingly, while the following describes illustrative methods, devices and systems of use thereof, persons of ordinary skill in the art will appreciate that the disclosed examplaries are not the only way to implement such methods, devices and systems, and the drawings and descriptions should be regarded as illustrative in nature and not restrictive.

Various techniques described herein can be used for various communication networks. The various aspects described herein are presented as methods, devices and systems that can include a number of components, elements, members, modules, nodes, peripherals, or the like. Further, these methods, devices and systems can include or not include additional components, elements, members, modules, nodes, peripherals, or the like. It is important to note that the terms "network" and "system" can be used interchangeably. Relational terms described herein such as "above" and "below", "left" and "right", "first" and "second", and the like may be used solely to distinguish one entity or action from another entity or action without necessarily requiring or implying any actual such relationship or order between such entities or actions. The term "or" is intended to mean an inclusive "or" rather than an exclusive "or." Further, the terms "a" and "an" are intended to mean one or more unless specified otherwise or clear from the context to be directed to a singular form.

Figure 1:
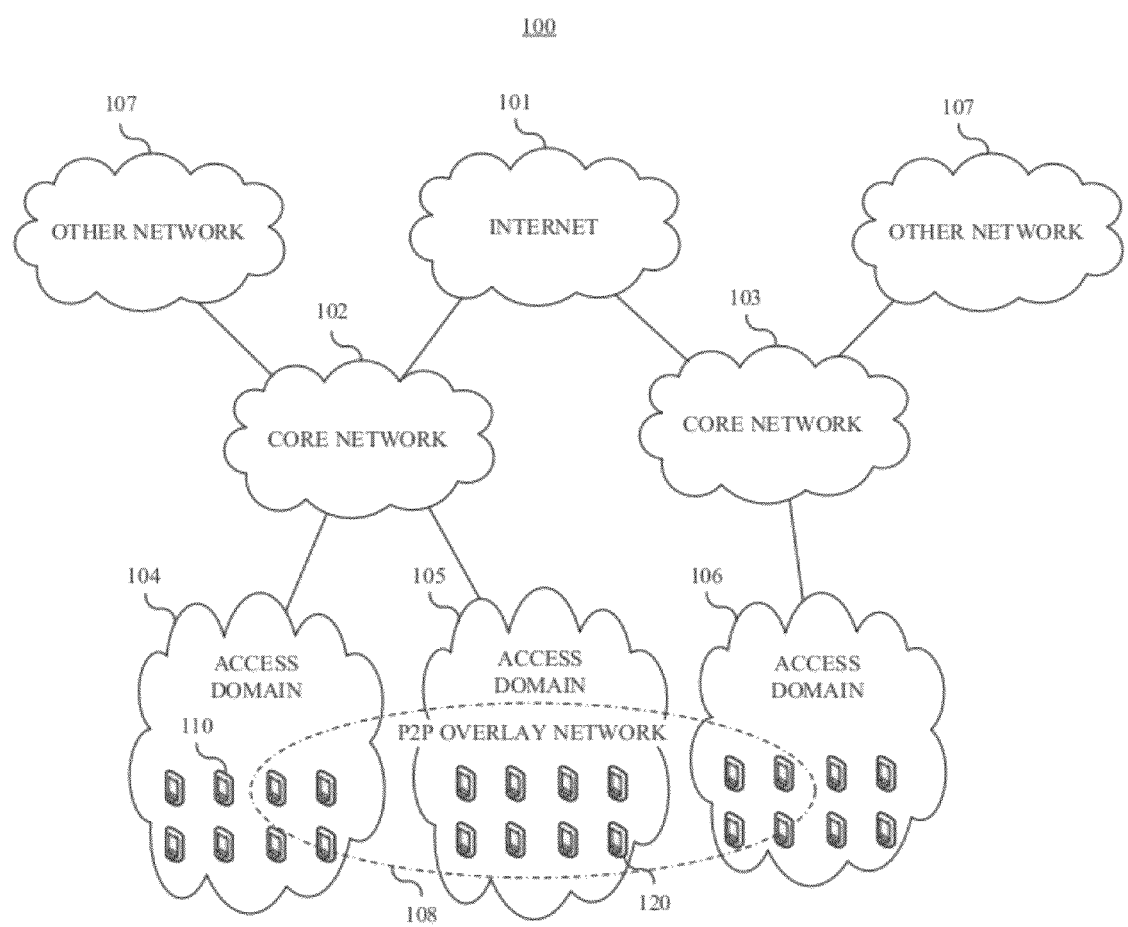
FIG. 1 illustrates an example of a prior art P2P overlay network.

FIG. 1 illustrates an example of a prior art P2P overlay network system 100. In this example, system 100 shows two core networks 102 and 103 operating three separate access domains 104, 105 and 106. Core network 102 operates access domains 104 and 105, while core network 103 operates access domain 106. Core networks typically include various control entities and gateways allowing communication across access domains. For instance, core network 102 allows communication between devices located in access domains 104 and 105, as well as with devices located in core network 103. Core networks 102 and 103 typically have access to Internet 101 and other network 107 such as the Internet multimedia subsystem ("IMS") network. Further, P2P overlay network 108 is arranged over multiple access networks 104, 105 and 106 and across core networks 102 and 103. FIG. 1 illustrates other network 107 twice and each can be interpreted as the same, similar or different other network 107.

Devices 110 and 120 can access other network 107 via the access domains 104, 105 and 106 associated with core networks 102 and 103, respectively. Further, device 120 also can access P2P overlay network 108 via access domains 104, 105 and 106 associated with core networks 102 and 103, respectively. While system 100 shows only three access domains, a typical core network usually includes a plurality of access domains. Further, devices 110 and 120 may use, for example, any appropriate Internet protocol ("IP") communication to connect to core networks 102 and 103. One skilled in the art will be familiar with the features, functionality and operation of typical devices 110 and 120 used in these networks. For instance, devices 110 and 120 may be used for tasks such as making and receiving phone calls, sending and receiving data to and from the core network, and other functions. Further, devices 110 and 120 can connect to core networks 102 and 103 using access technology such as cellular, wireless local area network ("WLAN"), infrared data association ("IrDA"), Bluetooth, asymmetric digital subscriber line ("ADSL"), symmetric digital subscriber line ("SDSL"), very high bit rate digital subscriber line ("VDSL"), Ethernet, frame relay and other like systems.

P2P overlay network 108 consists of various types of nodes, which are connection points within a communication network. These different types of nodes can include, for instance, a peer, a client, an admitting peer ("AP"), a registration peer and others. A peer is a host that is participating in P2P overlay network 108. An admitting peer ("AP") is a special type of peer that owns the client's node identification ("ID") in P2P overlay network 108 through the process of attachment. A registration peer is also a special type of peer that is used to register a node ID with P2P overlay network 108 through the process of registration. A client is a host that may not be participating in P2P routing, data storage or both in P2P overlay network 108. However, the client may store data, retrieve data or both from P2P overlay network 108. A person of ordinary skill in the art will appreciate the features, functionality and operation of typical P2P overlay networks, including functions such as attachment, registration, client routing and others.

Figure 2:
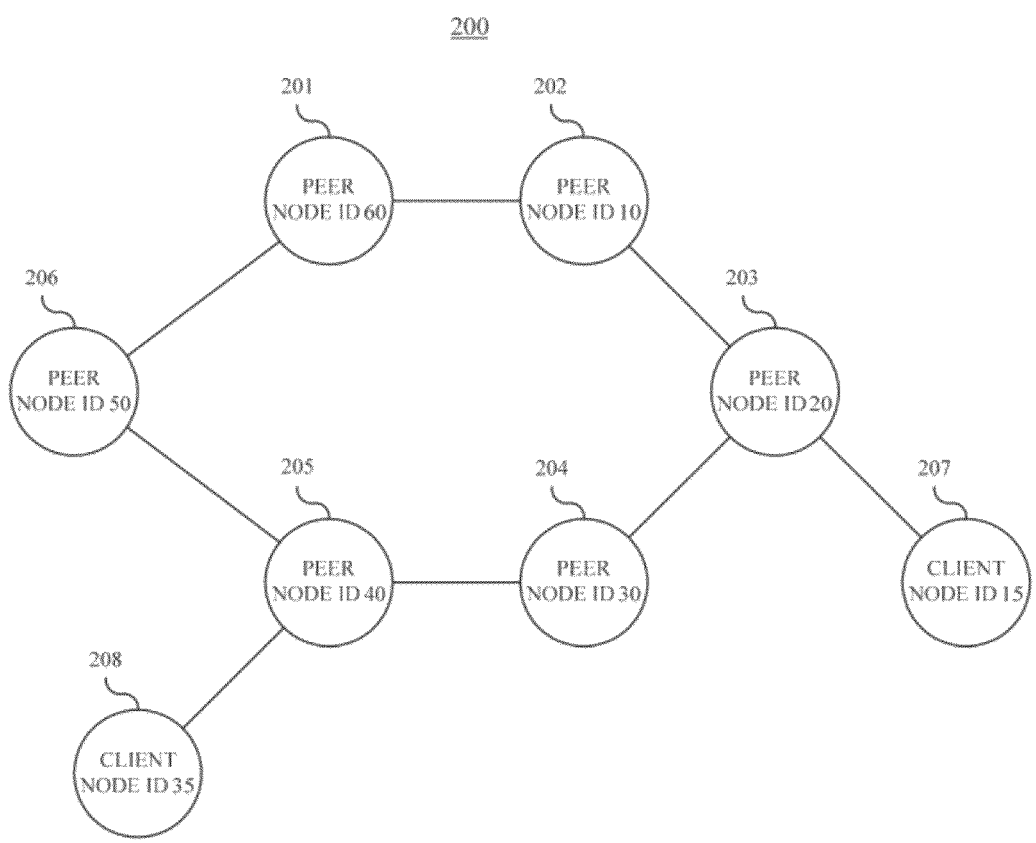
FIG. 2 illustrates an example of prior art client routing in a P2P overlay network.

FIG. 2 illustrates prior art client routing in P2P overlay network 200. In FIG. 2, P2P overlay network 200 includes peers 201 through 206 and clients 207 and 208. Peers 203 and 205 are the APs for clients 207 and 208, respectively.

Client routing includes locating clients 207 and 208 in P2P overlay network 200. P2P overlay network 200 can implement, for instance, a distributed hash table ("DHT") algorithm or a flooding algorithm, which is used to distribute the effort among peers 201 through 206 required to index and locate resources in P2P overlay network 200. However, more than one algorithm may be used to distribute information across P2P overlay network 200. A peer routes information on behalf of other peers as required by the DHT algorithm and may contain a portion of the data stored in P2P overlay network 200. There are different implementations of a DHT algorithm, but peers used in P2P overlay network 200 typically play the same role.

A DHT algorithm can be used to assign a unique identifier to each peer based on attributes of the peer such as the network address, media access control ("MAC") address, manufacturer's serial number or other attributes. The peer's unique identifier is typically processed using a hash function to create a unique node identifier ("node ID"). The node ID can be used to place peers on, for instance, a virtual network ring. Each peer maintains connections to other peers located, for instance, clockwise around the ring. This node ID is typically used to form the content of the DHT.

The Chord algorithm is one such DHT algorithm that can be used for routing information and identifying resources in P2P overlay network 200. The basic function of the Chord protocol is to map a key onto a node. The Chord algorithm can be used to hash each node's IP address to determine its node ID. As the Chord algorithm uses a ring-type network topology, the peers are sequentially ordered according to their node IDs.

For a client to be identified within P2P overlay network 200, it must register its location information with a registration peer, for instance, peer 206. This location information includes, for instance, a node ID and an address of record ("AoR"). The AoR can take the form, for instance, of "x@y.z," where the term "y.z" identifies the access domain while the term "x" identifies the node within the domain. In one embodiment, the registration information of clients 207 and 208 are the mapping between their AoR and node ID.

In FIG. 2, P2P overlay network 200 can use the Chord algorithm for routing information and identifying resources. For example, peer 203 has a node ID of "20." The immediate predecessor of peer 203 is peer 202, which has a node ID of "10." Applying the Chord algorithm, peer 203 is the AP of client 207 since peer 203 owns the node IDs between "11" and "20." As the AP to client 207, all the incoming and outgoing data to or from client 207 will go through peer 203. Similarly, peer 205 has a node ID of "40" and is the AP of client 208. The immediate predecessor of peer 205 is peer 204, which has a node ID of "30." Thus, peer 205 owns the node IDs between "31" and "40," and all the incoming and outgoing data to or from client 208 will go through peer 205.

P2P overlay network 200 can re-use the same hash function that was used to calculate the node ID to construct a unique resource identifier, also referred to as a key ID. Each peer in P2P overlay network 200 assumes a portion of the responsibility for storing and retrieving information about the available resources. For example, using the Chord algorithm, each peer is responsible for storing the contents of all key IDs that are less than or equal to the peer's node ID and greater than the node ID of the peer's predecessor. Further, each peer typically stores the node IDs of its successor peers as well as the node ID of its immediate predecessor. Client routing is typically performed by forwarding messages to a peer with the largest node ID in the routing table that precedes the key ID until the direct successor of a peer has a larger node ID than the key ID. This successor node is then responsible for the key ID.

For example, in FIG. 2 a key ID of "23" would be stored at peer 204, which has a node ID of "30." Suppose, for instance, that peer 202 with node ID of "10" would like to access the information associated with a key ID of "23." Using the routing table of peer 202 with node ID of "10," peer 202 sends a request to peer 203, which has a node ID of "20." Peer 203 sends the request to peer 204, which has a node ID of "30," and peer 204 replies with the information associated with the key ID of "23" through peer 203 to peer 202.

Figure 3:
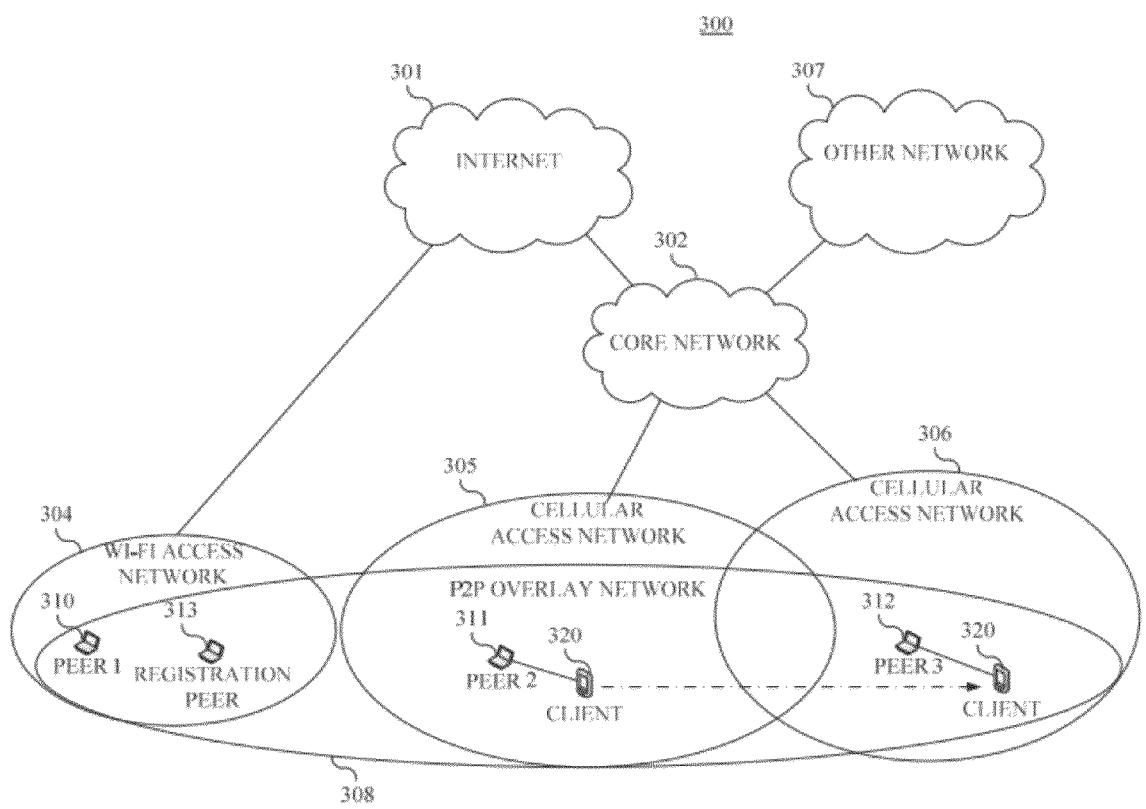
FIG. 3 illustrates one embodiment of client routing using another network in a P2P overlay network in accordance with various aspects set forth herein.

FIG. 3 illustrates one embodiment of client routing in a P2P overlay network system 300 in accordance with various aspects set forth herein. In FIG. 3, system 300 includes Wi-Fi access network 304 associated with Internet 301, and cellular access networks 305 and 306 associated with core network 302. Further, P2P overlay network 308 is arranged over Wi-Fi access network 304 and cellular access networks 305 and 306, respectively. As is well known to one skilled in the art, this is one of many typical P2P overlay network configurations.

Core network 302 includes access to Internet 301 and other network 307. Registration peer 318, first peer 310, second peer 311, and third peer 312 are peers in P2P overlay network 308. Registration peer 318 has access to P2P overlay network 308 using Wi-Fi access network 304 via Internet 301. First peer 310 has access to P2P overlay network 308 using Wi-Fi access network 304 via Internet 301 Second peer 311 and third peer 312 have access to P2P overlay network 308 and other network 307 using cellular access networks 305 and 306, respectively. Further, client 320 has access to P2P overlay network 308, Internet 301 and other network 307 using cellular access networks 305 and 306 via core network 302. FIG. 3 illustrates client 320 twice but should be interpreted as one and the same client 320.

In this embodiment, client 320 can remain registered to second peer 311 while attaching to other peers in P2P overlay network 308 as long as second peer 311 can locate client 320 using other network 307. For example, client 320 attaches to second peer 311. Client 320 registers its attachment to second peer 311 with registration peer 318. Any request for communication with client 320 within P2P overlay network 308 will be directed to second peer 311.

Client 320 may change its attachment due to, for instance, its mobility, its wireless signal quality, its network connection quality with the currently attached peer, changes to the topology of P2P overlay network 308, or other factors or combination of factors. In this example, client 320 is attached and registered to second peer 311 within cellular access network 305; thus, second peer 311 is the AP of client 320. Client 320 is able to communicate with second peer 311 using other network 307. Client 320 then travels from within cellular access network 305 to within cellular access network 306. Client 320 then attaches to third peer 312 that is located within cellular access network 306.

After client 320 attaches to third peer 312, first peer 310 requests communication with client 320 in P2P overlay network 308. Peer 310 is directed to second peer 311 to which client 320 is registered in P2P overlay network 308. Second peer 311 determines that client 320 is not attached to it in P2P overlay network 308. To locate client 320, second peer 311 uses other network 307 to send a request message to client 320 to request its location. After client 320 receives this message, client 320 uses other network 307 to send a reply message containing its location. Other network 307 can be, for instance, an IMS network. Further, the communication protocol used to send and receive messages over the IMS network can be, for instance, the session initiation protocol ("SIP"). Second peer 311 then forwards the location of client 320 to first peer 310. As long as second peer 311 can locate client 320 using other network 307, client 320 can continue to attach to different peers within P2P overlay network 308 without updating its registration information with registration peer 318. Alternatively, after client 320 receives this request message from second peer 311 via other network 307, client 320 uses the P2P overlay network 308 to send a reply message containing its location. Second peer 311 then forwards the location of client 320 to first peer 310. Further, the communication protocol used to send and receive messages over the P2P overlay network can be, for instance, the peer-to-peer session initiation protocol ("P2PSIP"). By taking this approach, the amount of transmit and receive signaling required to update the location of clients can be substantially reduced; thus, reducing the power consumption of devices and the amount of network traffic in P2P overlay network 308.

Figure 4:
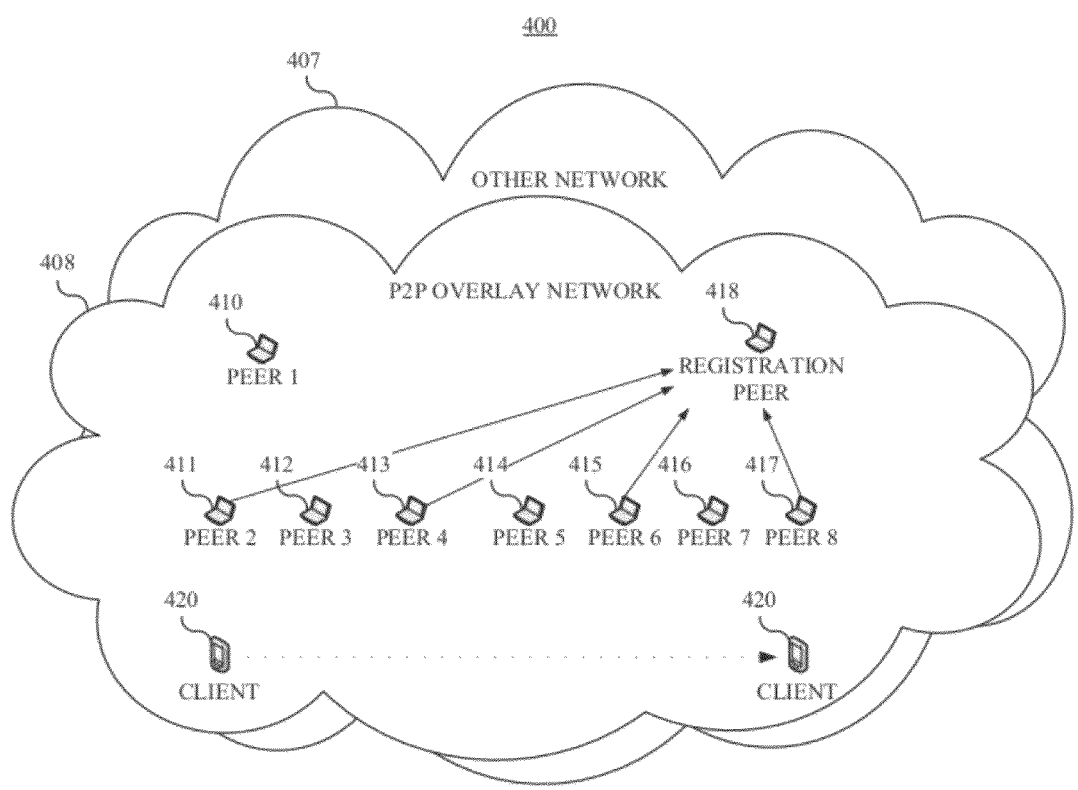
FIG. 4 illustrates one embodiment of registering a client in a P2P overlay network in accordance with various aspects set forth herein.

FIG. 4 illustrates another embodiment of registering a client in P2P overlay network system 400 in accordance with various aspects set forth herein. In FIG. 4 of system 400, first peer 410, peers 411 through 417, registration peer 418 and client 420 are peers in P2P overlay network 408 and have access to other network 407. In this embodiment, client 420 registers its location after changing its attachment a predetermined number of times to different peers 411 through 417 since its last registration with registration peer 418 in P2P overlay network 408. The predetermined number of times may be calculated based on, for instance, a traffic model, mobility model, attachment frequency, other factors or combination of factors. Further, these factors may be associated with client 420, P2P overlay network 408, other nodes in P2P overlay network 408 or any combination thereof. Further, the predetermined number of times can be calculated dynamically, statically, periodically, aperiodically or any combination thereof. By registering client 420 after a predetermined number of attachments to different peers 411 through 417, the amount of signaling using other network 407 can be controlled. FIG. 4 illustrates client 420 twice but should be interpreted as one and same client 420.

For example, client 420 attaches to peer 411. Client 420 registers its attachment to peer 411 with registration peer 418 in P2P overlay network 408. Any request for communication with client 420 in P2P overlay network 408 will be directed to peer 411. Client 420 may change its attachment to a different peer due to, for instance, its mobility, its wireless signal strength, its network connection quality with currently attached peer, changes to the topology of P2P overlay network 408 or other factors or combination of factors. Client 420 can remain registered to peer 411 while attaching to other peers in P2P overlay network 408 as long as peer 411 can locate client 420 using other network 407.

In this embodiment, P2P overlay network 408 requires client 420 to register once client 420 has attached to, for instance, two different peers since client's 420 last registration. For example, client 420 has to register with registration peer 418 after client 420 attaches to two different peers. For instance, client 420 initially attaches to and registers peer 411 with registration peer 418. Client 420 can remain registered to peer 411 since peer 411 can locate client 420 using other network 407. Client 420 then attaches to peer 412 and then peer 413. Because peer 413 is the second attachment of client 420 since its last registration, client 420 has to register peer 413 with registration peer 418.

Figure 5:
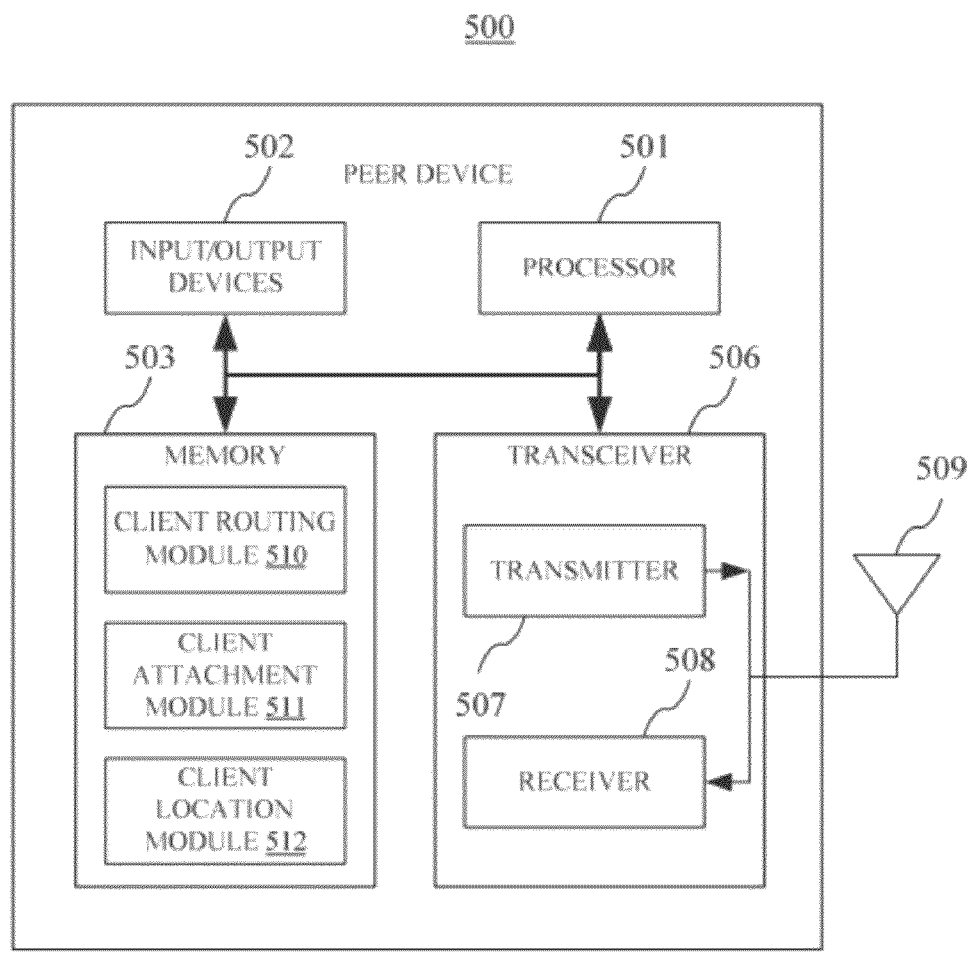
FIG. 5 illustrates one embodiment of a peer device in a P2P overlay network in accordance with various aspects set forth herein.

FIG. 5 illustrates one embodiment of a peer device in P2P overlay network 108, 308, and 408 in accordance with various aspects set forth herein. In FIG. 5, peer device 500 can include one or more processors 501 coupled to input/output devices 502, memory 503, transceiver 506 or any combination thereof, which can be utilized by peer device 500 to implement various aspects described herein. Transceiver 506 of peer device 500 includes transmitter 507 and receiver 508. Further, associated with peer device 500, transmitter 507 and receiver 508 are coupled to antenna 509. A person of ordinary skill in the art will recognize the components required for a typical peer device operating in a P2P overlay network.

Memory 503 of peer device 500 includes client routing module 510, which is operable to send, receive or both a request for communications with client 120, 320 and 420 in P2P overlay network 108, 308 and 408 and to send, receive or both the location of client 120, 320 and 420 in P2P overlay network 108, 308 and 408. Further, memory 503 of peer device 500 includes client attachment module 511, which is operable to determine whether client 120, 320 and 420 is attached or not attached to peer device 500 in P2P overlay network 108, 308 and 408. Finally, memory 503 of peer device 500 includes client location module 512. Client location module 512 is operable to send a request message to client 120, 320 and 420 using other network 107, 307 and 407 wherein the request message contains a request for client 120, 320 and 420 to provide its location in P2P overlay network 108, 308 and 408. Client location module 512 is also operable to receive a reply message from client 120, 320 and 420 using other network 107, 307 and 407 wherein the reply message contains the location of client 120, 320 and 420.

Figure 6:
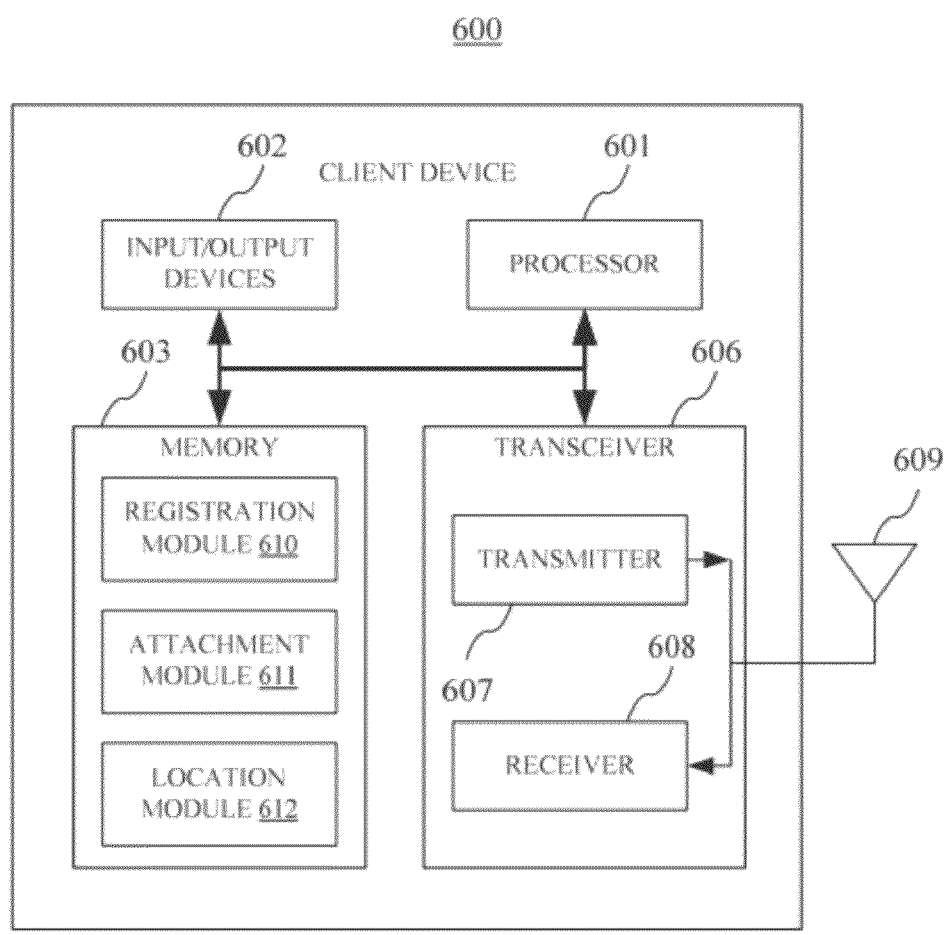
FIG. 6 illustrates one embodiment of a client device in a P2P overlay network in accordance with various aspects set forth herein.

FIG. 6 illustrates one embodiment of client device 600 in P2P overlay network 108, 308 and 408 in accordance with various aspects set forth herein. In FIG. 6, client device 600 can include one or more processors 601 coupled to input/output devices 602, memory 603, transceiver 606 or any combination thereof, which can be utilized by client device 600 to implement various aspects described herein. Transceiver 606 of client device 600 includes transmitter 607 and receiver 608. Further, associated with client device 600, transmitter 607 and receiver 608 are coupled to antenna 609.

Memory 603 of client device 600 includes registration module 610, which is operable to register peers in P2P overlay network 108, 308 and 408. Further, memory 603 of client device 600 includes attachment module 611, which is operable to attach to peers in P2P overlay network 108, 308 and 408. Finally, memory 603 of client device 600 includes location module 612. Location module 612 is operable to receive a request message from its registered peer, for instance peer 411, using another network 107, 307 and 407 wherein the request message contains a request for client device 600 to provide its location in P2P overlay network 108, 308 and 408. Location module 612 is also operable to send a reply message to its registered peer, for instance peer 411, using other network 107, 307 and 407 wherein the reply message contains its location.

Figure 7:
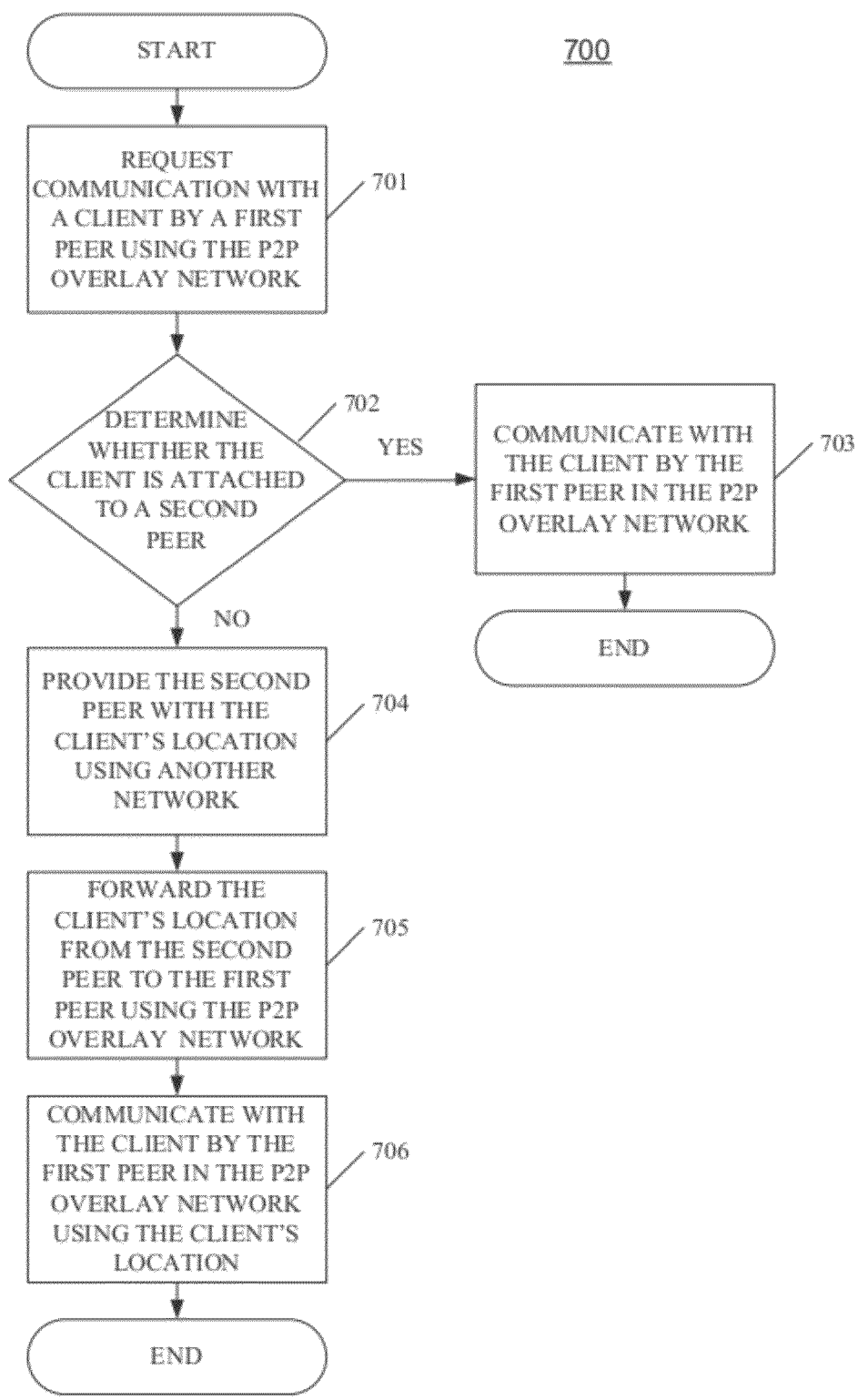
FIG. 7 shows a flow chart of one embodiment of a client routing method in a P2P overlay network in accordance with various aspects set forth herein.

FIG. 7 shows a flow chart of one embodiment of a client routing method 700 in a P2P overlay network in accordance with various aspects set forth herein. In FIG. 7, method 700 can start at block 701, where method 700 can request communication with a client by a first peer using the P2P overlay network, wherein the first peer is directed to a second peer to which the client is registered in the P2P overlay network. Client routing within the P2P overlay network may be operable to use, for instance, the Chord protocol. Further, the client may register with, for instance, a registration peer in the P2P overlay network. The client may also register its location in the P2P overlay network, for instance, after the client has changed its attachment to different peers a predetermined number of times since the client's last registration in the P2P overlay network. The predetermined number of times can be calculated based on, for instance, a traffic model, mobility model, attachment frequency or any combination thereof.

At block 702, method 700 can determine whether the client is attached or not attached to the second peer in the P2P overlay network. At block 703, since method 700 determined that the client is attached to the second peer in the P2P overlay network, the first peer can communicate with the client through the second peer in the P2P overlay network. Alternatively, as shown at block 704, since method 700 determined that the client is not attached to the second peer in the P2P overlay network, method 700 can provide the second peer with the client's location in the P2P overlay network using another network, wherein the client's location is associated with a third peer to which the client is attached in the P2P overlay network.

In one example, the second peer can send to the client using the other network a request message for the client's location within the P2P overlay network. The client can determine its location within the P2P overlay network, wherein the client's location is associated with the third peer. The client can send its location to the second peer using the P2P overlay network, the other network or both. The other network may be, for instance, an Internet protocol multimedia subsystem ("IMS") network. The request message may be provided using, for instance, a session initiation protocol ("SIP") in the IMS network. Further, the reply message may be provided using, for instance, the SIP protocol in the IMS network, a peer-to-peer initiation protocol ("P2PSIP") in the P2P overlay network or both. It is important to recognize that the second peer and the client can access the other network and can communicate using the other network.

At block 705, method 700 can forward the client's location in the P2P overlay network from the second peer to the first peer using the P2P overlay network. At block 706, the first peer can communicate with the client in the P2P overlay network using the client's location.

Figure 8:
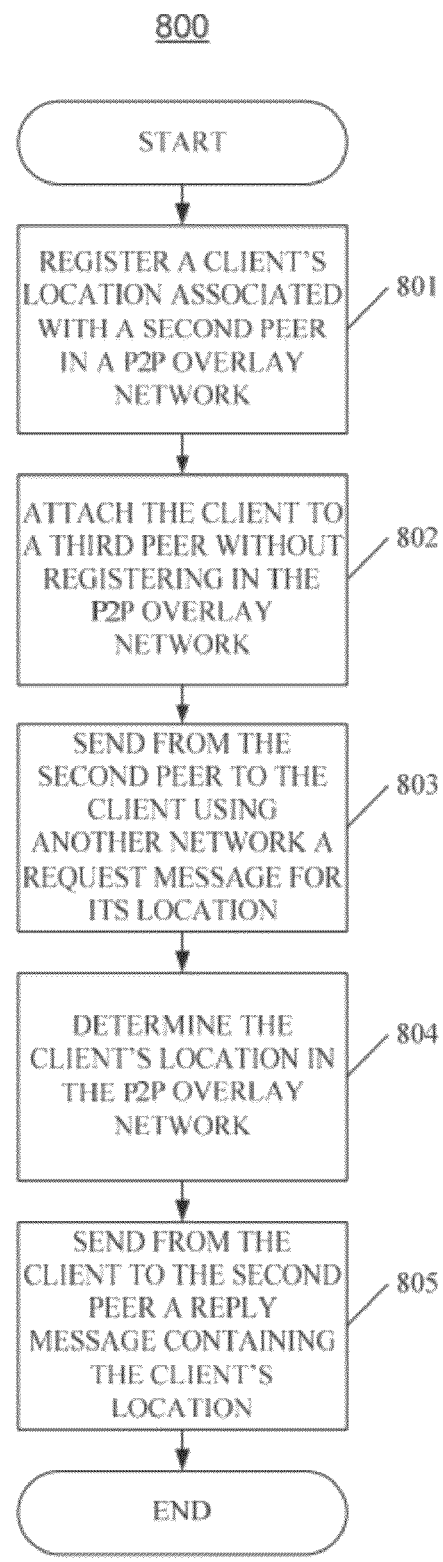
FIG. 8 shows a flow chart of one embodiment of a client routing method for a client in a P2P overlay network in accordance with various aspects set forth herein.

FIG. 8 shows a flow chart of one embodiment of a client routing method 800 for a client in a P2P overlay network in accordance with various aspects set forth herein. In FIG. 8, method 800 can start at block 801, where method 800 can register the client's location with a second peer in a P2P overlay network. Client routing within the P2P overlay network may be operable to use, for instance, the Chord protocol. Further, the client may register with, for instance, a registration peer in the P2P overlay network. The client may also register its location in the P2P overlay network, for instance, after the client has changed its attachment to different peers a predetermined number of times since the client's last registration in the P2P overlay network. The predetermined number of times can be calculated based on, for instance, a traffic model, mobility model, attachment frequency or any combination thereof.

At block 802, method 800 can attach the client to a third peer without registering in the P2P overlay network. At block 803, method 800 can send from the second peer to the client using another network a request message, wherein the request message contains a request for the client to provide its location within the P2P overlay network to the second peer. The other network may be, for instance, an Internet protocol multimedia subsystem ("IMS") network. The request message may be provided using, for instance, a session initiation protocol ("SIP") in the IMS network. Further, the reply message may be provided using, for instance, a SIP protocol in the IMS network, a peer-to-peer initiation protocol ("P2PSIP") in the P2P overlay network or both. It is important to recognize that the second peer and the client can access the other network and can communicate using the other network.

At block 804, method 800 can determine that the client's location is associated with the third peer within the P2P overlay network. At block 805, method 800 can send from the client to the second peer using the P2P overlay network, the other network or both a reply message containing the client's location in the P2P overlay network.

Figure 9:
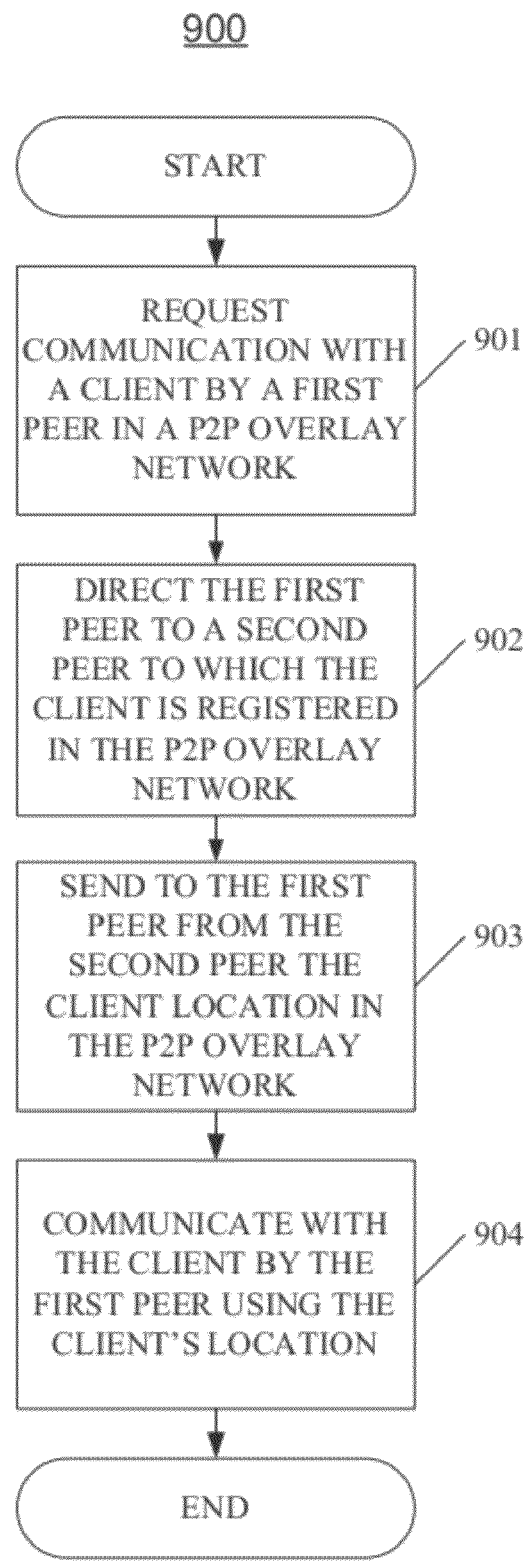
FIG. 9 shows a flow chart of one embodiment of a client routing method for a peer requesting communication with a client in a P2P overlay network in accordance with various aspects set forth herein.

FIG. 9 shows a flow chart of one embodiment of a client routing method 900 for a peer requesting communication with a client in a P2P overlay network in accordance with various aspects set forth herein. In FIG. 9, method 900 can start at block 901, where method 900 can request communication with a client by a first peer in a P2P overlay network. At block 902, method 900 can direct the first peer to a second peer in the P2P overlay network, wherein the client is registered but not necessarily attached to the second peer in the P2P overlay network. Client routing within the P2P overlay network may be operable to use, for instance, the Chord protocol. At block 903, method 900 can send from the second peer to the first peer using the P2P overlay network the client's location in the P2P overlay network irrespective of whether the client is attached to the second peer. At block 904, method 900 can communicate between the first peer and the client in the P2P overlay network using the client's location in the P2P overlay network.

Figure 10:
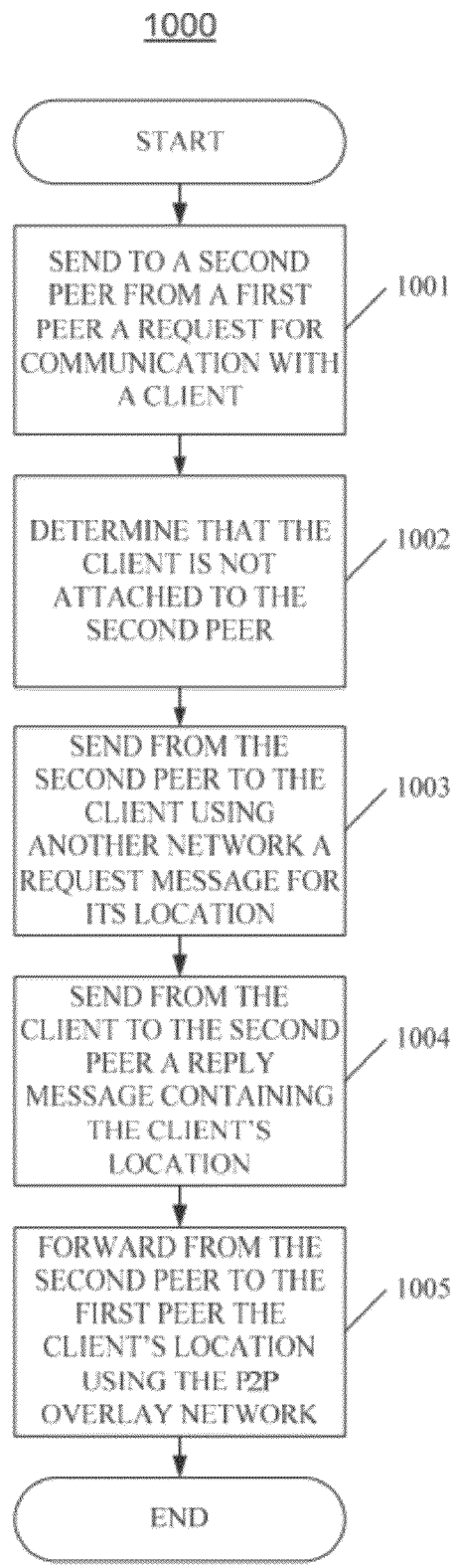
FIG. 10 shows a flow chart of another embodiment of a client routing method for an admitting peer in a P2P overlay network in accordance with various aspects set forth herein.

FIG. 10 shows a flow chart of another embodiment of a client routing method 1000 for an admitting peer in a P2P overlay network in accordance with various aspects set forth herein. In FIG. 10, method 1000 can start at block 1001, where method 1000 can send from a first peer to a second peer using a P2P overlay network a request for communication with a client in a P2P overlay network. At block 1002, method 1000 can determine that the client is not attached to the second peer in the P2P overlay network. At block 1003, method 1000 can send from the second peer to the client using another network a request message, wherein the request message requests the client's location in the P2P overlay network. The other network may be, for instance, an Internet protocol multimedia subsystem ("IMS") network. It is important to recognize that the second peer and the client can access the other network and can communicate using the other network. The request message may be provided using, for instance, a session initiation protocol ("SIP") in the IMS network.

At block 1004, method 1000 can send from the client to the second peer using the P2P overlay network, the other network or both a reply message containing the client's location in the P2P overlay network. The reply message may be provided using, for instance, a SIP protocol in the IMS network, a peer-to-peer initiation protocol ("P2PSIP") in the P2P overlay network or both. At block 1004, method 1000 can forward the client's location from the second peer to the first peer using the P2P overlay network.

Figure 11:
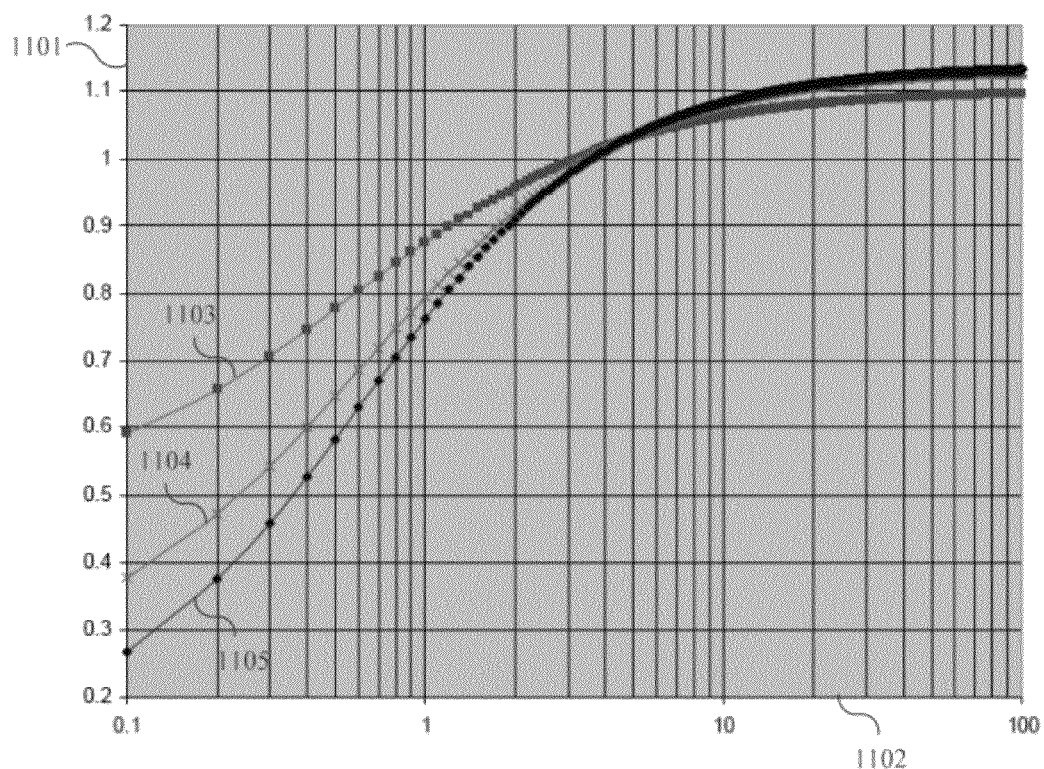
FIG. 11 illustrates simulated results of one embodiment of registering a client in a P2P overlay network in accordance with various aspects set forth herein.

FIG. 11 shows a graphical illustration of the simulated form of the relative signaling cost of the registration update for various embodiments of registering a client in P2P overlay network 108, 308 and 408 in accordance with various aspects of this disclosure set forth herein. The graphical illustration in its entirety is referred to by 1100. The relative signaling cost ratio is plotted on the abscissa 1101. The logarithmic call-to-mobility ratio ("CMR") is shown on the ordinate 1102. A smaller CMR indicates a client has, for instance, an increased frequency of attachment to different peers. Alternatively, a higher CMR indicates a client has, for instance, a decreased frequency of attachment to different peers. Graph 1103 shows the simulated relative signaling cost ratio for a client performing a registration update after attaching to two peers since its last registration in accordance with various aspects set forth herein. Graph 1104 shows the simulated relative signaling cost ratio for a client performing a registration update after attaching to four peers since its last registration in accordance with various aspects set forth herein. Graph 1105 shows the simulated relative signaling cost ratio for a client performing a registration update after attaching to eight peers since its last registration in accordance with various aspects set forth herein.

Having shown and described exemplary embodiments, further adaptations of the methods, devices and systems described herein may be accomplished by appropriate modifications by one of ordinary skill in the art without departing from the scope of the present disclosure. Several of such potential modifications have been mentioned, and others will be apparent to those skilled in the art. For instance, the exemplars, embodiments, and the like discussed above are illustrative and are not necessarily required. Accordingly, the scope of the present disclosure should be considered in terms of the following claims and is understood not to be limited to the details of structure, operation and function shown and described in the specification and drawings.

As set forth above, the described disclosure includes the aspects set forth below.

What is claimed is:

1. A method of client routing in a peer-to-peer ("P2P") overlay network, the method comprising:
    requesting communication with a client by a first peer in the P2P overlay network, wherein said first peer is directed to a second peer to which said client is registered in the P2P overlay network;
    determining that said client is not attached to said second peer in the P2P overlay network and said client has access to a second network, wherein the second network is not a P2P network;
    providing said second peer with said client's location in the P2P overlay network using at least said second network, wherein said client's location is associated with a third peer to which said client is attached in the P2P overlay network;
    forwarding said client's location from said second peer to said first peer using the P2P overlay network; and
    using said client's location to communicate with said client by said first peer in the P2P overlay network.

2. The method of claim 1, wherein the P2P overlay network is operable to use the Chord protocol for client routing.

3. The method of claim 1, wherein said second network is an Internet protocol multimedia subsystem ("IMS") network.

4. The method of claim 1, wherein said client is registered with a registration peer in the P2P overlay network.

5. The method of claim 1, wherein providing said second peer with said client's location in the P2P overlay network using at least said second network further comprises:
    providing a request message from said second peer to said client using said second network, wherein said request message contains a request for said client to provide its location in the P2P overlay network;
    determining location of said client in the P2P overlay network; and
    providing a reply message from said client to said second peer using the P2P overlay network, said second network or both, wherein said reply message contains said client's location in the P2P overlay network.

6. The method of claim 5, wherein said second network is an Internet protocol multimedia subsystem ("IMS") network and said request message is provided using a session initiation protocol ("SIP") in said IMS network.

7. The method of claim 5, wherein said second network is an Internet protocol multimedia subsystem ("IMS") network, and said reply message is provided using a session initiation protocol ("SIP") in said IMS network, a peer-to-peer session initiation protocol ("P2PSIP") in the P2P overlay network or both.

8. The method of claim 1, wherein said client registers its location in the P2P overlay network after said client has changed its attachment to different peers a predetermined number of times since said client's last registration in the P2P overlay network.

9. The method of claim 8, wherein said predetermined number of times is calculated based on a traffic model, mobility model, attachment frequency or any combination thereof.

10. In a client routing system in a peer-to-peer ("P2P") overlay network, a client routing system comprising:
- a client registering its location associated with a second peer in the P2P overlay network, attaching to a third peer in the P2P overlay network, receiving a request message from said second peer using a second network wherein said request message contains a request to provide said client's location within the P2P overlay network, determining said client's location is associated with said third peer in the P2P overlay network, and sending a reply message to said second peer using said second network, the P2P overlay network or both wherein said reply message contains said client's location, wherein the second network is not a P2P network;
- a first peer requesting communication with said client in the P2P overlay network wherein said first peer is directed to said second peer to which said client is registered in the P2P overlay network, receiving said client's location from said second peer using the P2P overlay network, and using said client's location to communicate with said client in the P2P overlay network;
- a second peer having said client registered to it, receiving a request for communication with said client by said first peer using the P2P overlay network, determining that said client is not attached to said second peer in the P2P overlay network and said client has access to said second network, sending a request message to said client using the second network wherein said request message contains a request for said client to provide said client's location in the P2P overlay network, receiving a reply message from said client using said second network, the P2P overlay network or both wherein said reply message contains said client's location in the P2P overlay network, and forwarding said client's location in the P2P overlay network to said first peer using the P2P overlay network; and
- a third peer having said client attached and not registered to it in the P2P overlay network.

11. The client routing system of claim 10, wherein the P2P overlay network is operable to use the Chord protocol for client routing.

12. The client routing system of claim 10, wherein said second network is an Internet protocol multimedia subsystem ("IMS") network.

13. The client routing system of claim 10, wherein said client is registered with a registration peer in the P2P overlay network.

14. The client routing system of claim 10, wherein said second network is an Internet protocol multimedia subsystem ("IMS") network, and said request message is provided using a session initiation protocol ("SIP") in said IMS network.

15. The client routing system of claim 10, wherein said second network is an Internet protocol multimedia subsystem ("IMS") network, and said reply message is provided using a session initiation protocol ("SIP") in said IMS network, using a peer-to-peer session initiation protocol ("P2PSIP") in the P2P overlay network or both.

16. The client routing system of claim 10, wherein said client registers its location in the P2P overlay network after said client has changed its attachment to different peers a predetermined number of times since said client's last registration in the P2P overlay network.

17. The client routing system of claim 16, wherein said predetermined number of times is calculated based on a traffic model, mobility model, attachment frequency or any combination thereof.

18. A peer device in a peer-to-peer ("P2P") overlay network, comprising:
- a computer platform including a processor and a memory in communication with said processor;
- a client routing module stored in said memory and in communication with said processor, wherein said client routing module is operable to send, receive or both a request for communication with a client in the P2P overlay network, and to send, receive or both said client's location in the P2P overlay network a client attachment module stored in said memory and in communication with said
- processor, wherein said client attachment module is operable to attach to said client and determine that said client is attached or not attached to said peer device in the P2P overlay network and said client has access to a second network, wherein the second network is not a P2P network; and
- a client location module stored in said memory and in communication with said processor, wherein said client location module is operable to send a request message to said client using said second network wherein said request message contains a request for said client to provide said client's location in the P2P overlay network and to receive a reply message from said client using said second network, the P2P overlay network or both wherein said reply message contains said client's location.

19. The peer device of claim 18, wherein the P2P overlay network is operable to use the Chord protocol for client routing.

20. The peer device of claim 18, wherein said second network is an Internet protocol multimedia subsystem ("IMS") network.

21. The peer device of claim 18, wherein said client is registered with a registration peer in the P2P overlay network.

22. The peer device of claim 18, wherein said second network is an Internet protocol multimedia subsystem ("IMS") network and said request message is provided using a session initiation protocol ("SIP") in said IMS network.

23. The peer device of claim 18, wherein said second network is an Internet protocol multimedia subsystem ("IMS") network, and said reply message is provided using a session initiation protocol ("SIP") in said IMS network, using a peer-to-peer session initiation protocol ("P2PSIP") in the P2P overlay network or both.

24. A client device in a peer-to-peer ("P2P") overlay network, comprising:
- a computer platform including a processor and a memory in communication with said processor;
- a registration module stored in said memory and in communication with said processor, wherein said registration module is operable to register in the P2P overlay network;
- an attachment module in said memory and in communication with said processor, wherein said attachment module is operable to attach to peers in the P2P overlay network; and a location module in said memory and in communication with said processor, wherein said location module is operable to:
receive a request message using a second network, wherein said request message contains a request to provide said client device's location in the P2P overlay network, and wherein the second network is not a P2P network,
determine said client device's location, and
send a reply message using said second network, the P2P overlay network or both wherein said reply message contains said client device's location.

25. The client device of claim 24, wherein the P2P overlay network is operable to use the Chord protocol for client routing.

26. The client device of claim 24, wherein said second network is an Internet protocol multimedia subsystem ("IMS") network.

27. The client device of claim 24, wherein said client device is registered with a registration peer in the P2P overlay network.

28. The client device of claim 24, wherein said second network is an Internet protocol multimedia subsystem ("IMS") network and said request message is provided using a session initiation protocol ("SIP") in said IMS network.

29. The client device of claim 24, wherein said second network is an Internet protocol multimedia subsystem ("IMS") network, and said reply message is provided using a session initiation protocol ("SIP") in said IMS network, a peer-to-peer session initiation protocol ("P2PSIP") in the P2P overlay network or both.

30. The client device of claim 24, wherein said registration module is further operable to register said client device's location with the P2P overlay network after said client has changed its attachment to different peers a predetermined number of times since said client's last registration in the P2P overlay network.

31. The client device of claim 30, wherein said predetermined number of times is calculated based on a traffic model, mobility model, attachment frequency or any combination thereof.

* * * * *